United States Patent
Yuri et al.

(10) Patent No.: US 12,522,555 B2
(45) Date of Patent: Jan. 13, 2026

(54) METHOD FOR PRODUCING α-HYDROXY CARBOXYLIC ACID COMPOSITION

(71) Applicant: MITSUBISHI GAS CHEMICAL COMPANY, INC., Tokyo (JP)

(72) Inventors: Michihiro Yuri, Niigata (JP); Shu Suzuki, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 471 days.

(21) Appl. No.: 18/017,449

(22) PCT Filed: Jul. 28, 2021

(86) PCT No.: PCT/JP2021/027886
§ 371 (c)(1),
(2) Date: Jan. 23, 2023

(87) PCT Pub. No.: WO2022/025110
PCT Pub. Date: Feb. 3, 2022

(65) Prior Publication Data
US 2023/0271913 A1    Aug. 31, 2023

(30) Foreign Application Priority Data
Jul. 31, 2020    (JP) .................................. 2020-130211

(51) Int. Cl.
C07C 51/44    (2006.01)
C07C 51/377    (2006.01)

(52) U.S. Cl.
CPC ............ *C07C 51/44* (2013.01); *C07C 51/377* (2013.01)

(58) Field of Classification Search
CPC ........ C07C 51/44; C07C 59/01; C07C 51/377
See application file for complete search history.

(56) References Cited

U.S. PATENT DOCUMENTS

| | | |
|---|---|---|
| 5,053,535 A | 10/1991 | Shima et al. |
| 6,582,943 B1 | 6/2003 | Chauhan et al. |
| 6,630,603 B1 | 10/2003 | Van Breugel et al. |
| 2004/0129635 A1 | 7/2004 | van Krieken et al. |
| 2004/0267050 A1 | 12/2004 | DeCourcy et al. |
| 2007/0010690 A1 | 1/2007 | DeCourcy et al. |
| 2008/0214842 A1 | 9/2008 | Ogawa et al. |
| 2009/0318716 A1 | 12/2009 | Ogawa et al. |
| 2014/0171614 A1 | 6/2014 | Yamada et al. |

FOREIGN PATENT DOCUMENTS

| | | |
|---|---|---|
| CN | 1592730 A | 3/2005 |
| CN | 1635990 A | 7/2009 |
| CN | 1847212 B | 5/2010 |
| EP | 0 448 797 B1 | 3/1996 |
| JP | 2002-540090 A | 11/2002 |
| JP | 2006-169185 A | 6/2006 |
| JP | 2008-056654 A | 3/2008 |
| WO | 2013/015212 A1 | 1/2013 |
| WO | 2015/016217 A1 | 2/2015 |

OTHER PUBLICATIONS

Extended European Search Report issued in European Patent Application No. 21851128.5 dated Jan. 11, 2024.
International Search Report issued in International Bureau of WIPO Patent Application No. PCT/JP2021/027886, dated Oct. 19, 2021, along with an English translation thereof.
Written Opinion issued in International Bureau of WIPO Patent Application No. PCT/JP2021/027886, dated Oct. 19, 2021, along with an English translation thereof.

*Primary Examiner* — Kamal A Saeed
(74) *Attorney, Agent, or Firm* — GREENBLUM & BERNSTEIN, P.L.C.

(57) ABSTRACT

A method for producing an α-hydroxycarboxylic acid composition includes distilling a mixed solution containing an α-hydroxycarboxylic acid, water, and an organic impurity, wherein the distillation is performed under a condition that an upper limit temperature of a bottoms liquid is 140° C. or lower.

8 Claims, No Drawings

METHOD FOR PRODUCING α-HYDROXY CARBOXYLIC ACID COMPOSITION

TECHNICAL FIELD

The present invention relates to a method for producing an α-hydroxycarboxylic acid composition.

BACKGROUND ART

α-Hydroxycarboxylic acids per se are used for applications such as foods, cosmetics, fragrances, preservatives, and pH adjusters. In addition, α-hydroxycarboxylic acids are important chemical raw materials and intermediates, and are used for the production of various products. Due to recent growing awareness of environmental issues, α-hydroxycarboxylic acids have attracted attention also as raw materials of biodegradable polymer materials.

α-Hydroxycarboxylic acids are generally produced by oxidation of a diol, introduction of a cyano group and hydrolysis thereof, or the like. Since α-hydroxycarboxylic acids thus obtained contain impurities, water, and the like, it is necessary to remove them by purification.

For example, Patent Literature 1 describes an invention related to a method for purifying a hydroxycarboxylic acid such as glycolic acid. Specifically, Patent Literature 1 describes a method for purifying a hydroxycarboxylic acid in which when purifying an aqueous hydroxycarboxylic acid solution by crystallization, followed by separating the formed hydroxycarboxylic acid crystals from the mother liquor and then further purifying the crystals by washing, an aqueous hydroxycarboxylic acid solution is used as a washing liquid.

It is described that when using the purification method described in Patent Literature 1, it is possible to purify (produce) a hydroxycarboxylic acid in an industrially appropriate high yield by crystallization with a small heat load on the hydroxycarboxylic acid.

Patent Literature 1 describes that a hydroxycarboxylic acid contains, as impurities, a dimer or oligomer formed by ester-forming dehydration condensation and a dimer formed by ether-forming dehydration condensation.

It is also described that distillation is basically difficult to apply because hydroxycarboxylic acids are easily polycondensed under heating.

PRIOR ART LITERATURES

Patent Literature

Patent Literature 1: JP 2006-169185 A

SUMMARY OF INVENTION

Problems to be Solved by the Invention

By the method described in Patent Literature 1, a hydroxycarboxylic acid can be purified (produced) in a high purity and a constant yield. However, in the purification method of Patent Literature 1, the recovery rate is as low as 15.2 to 27.5% in crystallization rate in one crystallization process and the purity tends to decrease as the crystallization rate is increased.

In view of this, the present invention provides a means for producing an α-hydroxycarboxylic acid composition purified in a high yield and a high purity.

Means for Solving the Problems

The present inventors conducted intensive studies to solve the above problems. As a result, the present inventors have found that the above problems can be solved by performing distillation under prescribed conditions, and have accomplished the present invention. That is, the present invention is, for example, as follows.

[1] A method for producing an α-hydroxycarboxylic acid composition, including distilling a mixed solution containing an α-hydroxycarboxylic acid, water, and an organic impurity,
wherein the distillation is performed under a condition that an upper limit temperature of a bottoms liquid is 140° C. or lower.

[2] The method according to [1], wherein the α-hydroxycarboxylic acid is 2-hydroxyisobutyric acid.

[3] The method according to [2], wherein a content of 2-hydroxyisobutyric acid in the α-hydroxycarboxylic acid composition is 95% or more based on a total mass of the α-hydroxycarboxylic acid composition.

[4] The method according to any one of [1] to [3], wherein the upper limit temperature of the bottoms liquid is 135° C. or lower.

[5] The method according to any one of [1] to [4], wherein the bottoms liquid after the distillation contains an α-hydroxycarboxylic acid.

[6] A method for producing an α,δ-unsaturated carboxylic acid, including dehydrating an α-hydroxycarboxylic acid produced by the method according to any one of [1] to [5].

[7] An α-hydroxycarboxylic acid composition including 2-hydroxyisobutyric acid,
wherein a content of the 2-hydroxyisobutyric acid is 95% or more based on a total mass of the α-hydroxycarboxylic acid composition.

Advantageous Effects of Invention

By the present invention is provided a means for producing an α-hydroxycarboxylic acid composition purified in a high yield and a high purity.

DESCRIPTION OF EMBODIMENTS

In the following, embodiments for carrying out the present invention will be described in detail.

The method for producing an α-hydroxycarboxylic acid composition of the present invention includes distilling a mixed solution containing an α-hydroxycarboxylic acid, water, and an organic impurity. At this time, the distillation is performed under the condition that the upper limit temperature of the bottoms liquid is 140° C. or lower.

Since all the α-hydroxycarboxylic acid contained in the mixed solution can be subjected to the purification treatment by distillation, the α-hydroxycarboxylic acid composition can be obtained in a high recovery rate. Owing to that the upper limit temperature of the bottoms liquid is 140° C. or lower, side reactions, such as polycondensation, ester-forming dehydration condensation, and ether-forming dehydration condensation, of the α-hydroxycarboxylic acid can be prevented, and a high-purity α-hydroxycarboxylic acid composition can be obtained.

<Mixed Solution>

The mixed solution contains an α-hydroxycarboxylic acid, water, and an organic impurity. In addition, the mixed solution may further contain an inorganic impurity or the like.

[α-Hydroxycarboxylic Acid]

The α-hydroxycarboxylic acid is not particularly limited, and examples thereof include glycolic acid, lactic acid, α-hydroxybutyric acid, α-hydroxyisobutyric acid, α-hydroxyvaleric acid, 2-hydroxy-2-methylbutyric acid, 2-hydroxyisovaleric acid, α-hydroxycaproic acid, 2-hydroxy-2-methylvaleric acid, 2-hydroxy-3-methylvaleric acid, α-hydroxyisocaproic acid, 2-hydroxy-3,3-dimethylbutyric acid, α-hydroxyenanthic acid, and α-hydroxycaprylic acid. Among them, the α-hydroxycarboxylic acid preferably contains glycolic acid, lactic acid, α-hydroxybutyric acid, α-hydroxyisobutyric acid, or α-hydroxyvaleric acid, more preferably contains glycolic acid, lactic acid, α-hydroxybutyric acid, or α-hydroxyisobutyric acid, further preferably contains α-hydroxybutyric acid or α-hydroxyisobutyric acid, and particularly preferably contains α-hydroxyisobutyric acid.

As to the α-hydroxycarboxylic acid described above, a single member may be contained or two or more members may be contained.

The content of the α-hydroxycarboxylic acid is preferably 10 to 70% by mass, and more preferably 40 to 60% by mass based on the total mass of the mixed solution. It is preferable that the content of the α-hydroxycarboxylic acid is 10% by mass or more because the amount of the α-hydroxycarboxylic acid recovered per treated amount can be increased. On the other hand, it is preferable that the content of the α-hydroxycarboxylic acid is 70% by mass or less because precipitation of the α-hydroxycarboxylic acid can be prevented when the raw material temperature is lowered.

[Water]

The content of the water is preferably 30 to 90% by mass, and more preferably 40 to 60% by mass based on the total mass of the mixed solution. It is preferable that the content of the water is 30% by mass or more because precipitation of the α-hydroxycarboxylic acid can be prevented when the raw material temperature is lowered. On the other hand, it is preferable that the content of the water is 90% by mass or less because the amount of the α-hydroxycarboxylic acid recovered per treated amount can be increased.

[Organic Impurity]

The organic impurity is not particularly limited, and examples thereof include organic impurities derived from the production process of the α-hydroxycarboxylic acid and contained, and organic impurities derived from side reactions of the produced α-hydroxycarboxylic acid and contained.

The organic impurities derived from the production process of the α-hydroxycarboxylic acid and contained are not particularly limited, and examples thereof include raw materials, intermediates, organic catalysts, microbial catalysts, and decomposition products thereof. Examples thereof include a 1,2-diol, an α-cyanohydrin, an α-hydroxyamide, an α-hydroxycarboxylic acid ester, and an α,β-unsaturated carboxylic acid ester.

The 1,2-diol is not particularly limited, and examples thereof include ethylene glycol, 1,2-propanediol, 1,2-butanediol, 2-methyl-1,2-propanediol, and 1,2-pentanediol.

The α-cyanohydrin is not particularly limited, and examples thereof include formaldehyde cyanohydrin, acetaldehyde cyanohydrin, acetone cyanohydrin (ACH), and propionaldehyde cyanohydrin.

The α-hydroxyamide is not particularly limited, and examples thereof include glycolamide, N-hydroxy acetamide, lactamide, 2-hydroxypropylamide, 2-hydroxybutyramide, and 2-hydroxyisobutyramide.

The α-hydroxycarboxylic acid ester is not particularly limited, and examples thereof include methyl glycolate, ethyl glycolate, propyl glycolate, isopropyl glycolate, butyl glycolate, methyl 2-hydroxyacetate, ethyl 2-hydroxyacetate, methyl lactate, ethyl lactate, methyl 2-hydroxybutyrate, ethyl 2-hydroxybutyrate, methyl 2-hydroxyisobutyrate, and ethyl 2-hydroxyisobutyrate.

The α,β-unsaturated carboxylic acid ester is not particularly limited, and examples thereof include methyl acrylate, ethyl acrylate, methyl methacrylate, ethyl methacrylate, methyl 2-butenoate, ethyl 2-butenoate, methyl 2-methyl-2-butenoate, and ethyl 2-methyl-2-butenoate.

The organic impurities derived from a side reaction of the produced α-hydroxycarboxylic acid and contained are not particularly limited, and examples thereof include an α,β-unsaturated carboxylic acid, a polycondensate of an α-hydroxycarboxylic acid, a dimer or oligomer formed by ester-forming dehydration condensation of an α-hydroxycarboxylic acid, and a dimer formed by ether-forming dehydration condensation of an α-hydroxycarboxylic acid.

The α,β-unsaturated carboxylic acid is not particularly limited, and examples thereof include acrylic acid, methacrylic acid, 2-butenoic acid, and 2-methyl-2-butenoic acid.

As to the organic impurities described above, a single member thereof may be contained or two or more members thereof may be contained.

The content of the organic impurities is preferably 1.0% by mass or less, more preferably 0.5% by mass or less, and still more preferably 0.3% by mass or less based on the total mass of the mixed solution. The content of the organic impurities is preferably 1.0% by mass or less because a high-purity α-hydroxycarboxylic acid composition can be obtained. When two or more organic impurities are contained, the total content of the organic impurities is preferably in the above range.

In one embodiment, the content of the dimer of the α-hydroxycarboxylic acid ester, the α,β-unsaturated carboxylic acid, and the α-hydroxycarboxylic acid that may be particularly contained as organic impurities in the mixed solution is as follows.

That is, the content of the α-hydroxycarboxylic acid ester is preferably 1% or less, more preferably 0.5% or less, still more preferably 0.1% or less, and further preferably 0.01% or less based on the total mass of the mixed solution.

In addition, the content of the α,β-unsaturated carboxylic acid is preferably 1% or less, more preferably 0.5% or less, still more preferably 0.1% or less, and further preferably 0.03% or less based on the total mass of the mixed solution.

Furthermore, the content of the dimer of a α-hydroxycarboxylic acid is preferably 1% or less, more preferably 0.5% or less, still more preferably 0.1% or less, and further preferably 0.03% or less based on the total mass of the mixed solution.

[Inorganic Impurity]

The inorganic impurity is not particularly limited, and examples thereof include inorganic catalysts and metal elements.

The inorganic catalyst is not particularly limited, and examples thereof include inorganic catalysts derived from the production process of an α-hydroxycarboxylic acid and contained, and decomposition products thereof.

The metal element is not particularly limited, and examples thereof include Ag, Al, Au, Ba, Ca, Cd, Co, Cr, Cu, Fe, K, Li, Mg, Mn, Mo, Na, Ni, Pb, Sn, Sr, Ti, Zn, and Zr.

As to the inorganic impurities described above, a single member thereof may be contained or two or more members thereof may be contained.

The content of the inorganic impurities is preferably 0.1% by mass or less, more preferably 0.05% by mass or less, and still more preferably 0.01% by mass or less based on the total mass of the mixed solution. The content of the inorganic impurities is preferably 0.1% by mass or less because a high-purity α-hydroxycarboxylic acid composition can be obtained. When two or more inorganic impurities are contained, the total content of the inorganic impurities is preferably in the above range.

[Method for Producing Mixed Solution]

The method for producing the mixed solution is not particularly limited, and the mixed solution can be produced by a publicly known method.

For example, glycolic acid can be produced by a method including a step of reacting formaldehyde with hydrocyanic acid (hydrogen cyanide) to obtain formaldehyde cyanohydrin, and a step of hydrolyzing the cyano group of the formaldehyde cyanohydrin to obtain glycolic acid. At this time, in each of the steps, an organic catalyst, a microbial catalyst, or an inorganic catalyst may be used.

In addition, lactic acid can be produced by a method including a step of hydrolyzing lactonitrile to obtain crude lactic acid, a step of reacting the crude lactic acid with an alcohol to obtain a lactic acid ester, and a step of hydrolyzing the lactic acid ester to obtain lactic acid. At this time, the lactic acid ester is preferably purified by distillation or the like before hydrolysis.

Lactic acid can also be produced by a method including a step of fermenting a carbohydrate such as sucrose by a microorganism. At this time, the microorganism may be genetically modified.

Furthermore, α-hydroxyisobutyric acid can be produced by a method including a step of reacting acetone with hydrocyanic acid (hydrogen cyanide) to obtain acetone cyanohydrin (ACH), a step of hydrolyzing the cyano group of the acetone cyanohydrin to obtain α-hydroxyisobutyramide, a step of esterifying the α-hydroxyisobutyramide to obtain α-hydroxyisobutyl ester, and a step of hydrolyzing the α-hydroxyisobutyl ester to obtain α-hydroxyisobutyric acid (for example, a new ACH method). At this time, in each of the steps, an organic catalyst, a microbial catalyst, or an inorganic catalyst may be used.

In addition, the α-hydroxycarboxylic acid can be produced by selective oxidation of a primary alcohol in a 1,2-diol. At this time, TEMPO (2,2,6,6-tetramethylpiperidin-1-oxyl) or the like is usually used as a catalyst.

The reaction solution containing the α-hydroxycarboxylic acid produced as described above is subjected to distillation as a mixed solution.

For the purpose of, for example, adjusting the components of the mixed solution, a solution obtained by pretreating the obtained reaction solution may be used as the mixed solution. The pretreatment is not particularly limited, and examples thereof include preliminary purification and pH adjustment.

Examples of the preliminary purification include filtration, centrifugation, chromatography, and simple distillation. Filtration can remove solid impurities such as insoluble matters contained in the reaction solution. In addition, centrifugation can remove impurities having different specific gravities. Chromatography can remove impurities having different polarities. In addition, simple distillation can remove impurities having different boiling points (preferably, water excessively contained in the reaction solution). These preliminary purifications may be employed singly or two or more of them may be employed in combination.

In the pH adjustment, the pH may be adjusted to the acidic side using an acidic compound, or the pH may be adjusted to the basic side using a basic compound.

<Distillation>

At least part of the water and the organic impurities is removed by distilling the above-described mixed solution, so that an α-hydroxycarboxylic acid composition can be produced.

The distillation as referred to herein is an operation of concentrating a substance having a high relative volatility into a vapor phase and a substance having a low relative volatility into a liquid phase by adding heat to the mixed solution, and separately recovering the substances to separate the substances into individual components. Examples of the distillation is distillation in which a generated vapor is distilled off as it is without being fractionally condensed; specifically, single distillation without reflux (batch distillation); equilibrium flash distillation (continuous distillation); and fractionation (rectification) in which sequential mass transfer between a reflux and a vapor is performed. At this time, a packed tower, a plate tower, or the like is used for the mass transfer in the fractionation (rectification). Among them, the distillation is preferably single distillation. The single distillation is preferable because it is more economical than equilibrium flash distillation and rectification.

At this time, the distillation is performed under the condition that the upper limit temperature of the bottoms liquid is 140° C. or lower. The upper limit temperature of the bottoms liquid is preferably 138° C. or lower, more preferably 135° C. or lower, still more preferably 130° C. or lower, particularly preferably 125° C. or lower, and most preferably 120° C. or lower. The lower limit temperature of the bottoms liquid is not particularly limited as long as it is a temperature at which a target component evaporates, but it is preferably equal to or higher than the melting point of the α-hydroxycarboxylic acid.

The "bottoms liquid" as referred to herein means a liquid phase (a liquid existing in the bottom tower) obtained by concentrating at least part of substances having a low relative volatility during distillation. The "temperature of the bottoms liquid" is measured by a resistance temperature detector or a K thermocouple. For example, in the cases of single distillation and rectification, usually, the temperature of the liquid existing in the evaporator (the bottom of the distillation column) after the start of evaporation of a substance having a high relative volatility is taken as the temperature of the bottoms liquid. In addition, in equilibrium flash distillation, the mixed solution is usually separated into gas and liquid by a flash drum to generate a liquid phase in which a substance having a low relative volatility is concentrated, and the temperature of this liquid phase is the temperature of a bottoms liquid. Since the distillation is regulated by the "upper limit temperature of the bottoms liquid", the temperature of the upper limit temperature of the bottoms liquid is usually controlled. On the other hand, distillation that does not involve temperature control of the bottoms liquid, such as continuous distillation in which a liquid sample is introduced from the top, is not included in the aforementioned distillation. For example, in the case of continuous distillation in which a liquid sample is introduced from the top, evaporation and condensation are continuously performed, and temperature control of a liquid phase (bottoms liquid) obtained by concentrating a substance having a low relative volatility is not performed. In such continuous distillation in which a liquid sample is introduced from the top, the targeted α-hydroxycarboxylic acid may not be obtained in high purity and high recovery rate under the conditions for performing the distillation (temperature condition, pressure condition, etc.).

The pressure of the distillation may be either normal pressure (101 kPaA) or reduced pressure, but is preferably reduced pressure because side reactions of an α-hydroxycarboxylic acid can be prevented by lowering the heating temperature. Specifically, the pressure of distillation is preferably 0.2 to 30.0 kPaA, more preferably 4.0 to 30.0 kPaA, and still more preferably 4.0 to 6.0 kPaA. A distillation pressure of 0.2 kPaA or more is preferable because it affords superior economic efficiency. On the other hand, it is preferable that the distillation pressure is 30.0 kPaA or less because the upper limit temperature of the bottoms liquid can be lowered. In addition, vacuum distillation can also be performed by setting the pressure to vacuum.

In the distillation, it is preferable to use a carrier gas. Examples of the carrier gas include inert gases, such as hydrogen gas, nitrogen gas, helium gas, and argon gas. Further, steam distillation using heated steam as a carrier gas may be employed. Among these, from the viewpoint of oxidation prevention, it is preferable to use an inert gas as the carrier gas, and it is more preferable to use a nitrogen gas.

The α-hydroxycarboxylic acid composition may be obtained as an evaporated product (an α-hydroxycarboxylic acid is contained in the congealed liquid after distillation), or may be obtained as a residue (an α-hydroxycarboxylic acid is contained in the bottoms liquid after distillation).

When the α-hydroxycarboxylic acid composition is obtained as an evaporated product, any of single distillation, equilibrium flash distillation, and rectification can be suitably applied.

In the case of single distillation, the results will be as follows. That is, when the mixed solution charged in an evaporator (the bottom of a distillation column) is heated, an α-hydroxycarboxylic acid is evaporated. Then, the evaporated α-hydroxycarboxylic acid passes through the distillation column and is cooled in a condenser to become a solid or a liquid. After the distillation, an α-hydroxycarboxylic acid composition can be obtained by collecting a congealed product (the evaporated product).

In the case of equilibrium flash distillation, the results will be as follows. That is, the mixed solution charged in an evaporator is heated under pressure. The heated mixed solution is then blown into a flash drum operated at low pressure. As a result, the α-hydroxycarboxylic acid in the mixed solution is evaporated. The α-hydroxycarboxylic acid evaporated is obtained from the top of the flash drum by performing gas-liquid separation in the flash drum. The evaporated α-hydroxycarboxylic acid is cooled in a condenser to become a solid or a liquid, and a congealed product (evaporated product) is recovered to successfully afford an α-hydroxycarboxylic acid composition.

Further, in the case of rectification, the results will be as follows. That is, when the mixed solution charged in an evaporator (the bottom of a distillation column) is heated, an α-hydroxycarboxylic acid is evaporated. Then, the evaporated α-hydroxycarboxylic acid is fed to a packed tower, a plate tower or the like of a distillation tower. The evaporated α-hydroxycarboxylic acid is further purified by being heated to generate a vapor in a lower portion of a packed tower, a plate tower, or the like, and being cooled to generate a reflux in an upper portion to cause sequential mass transfer between the reflux and the vapor in the tower such as a packed tower or a plate tower. The vapor that has passed through the distillation column is cooled in a condenser to become a solid or a liquid. The α-hydroxycarboxylic acid composition can be obtained by recovering a congealed product (evaporated product) derived from the vapor in the distillation tower or an evaporated product derived from the reflux liquid in the distillation tower. The number of plates of the distillation tower and the reflux ratio (refluxing amount/fraction-extracting amount) may be appropriately set.

When the α-hydroxycarboxylic acid composition is obtained as a residue, single distillation or equilibrium flash distillation can be suitably applied.

In the case of single distillation, the results will be as follows. That is, when the mixed solution charged in an evaporator (the bottom of a distillation column) is heated, water and organic impurities are volatilized. Then, the water and the organic impurities pass through the distillation column, are cooled in a condenser, and are discharged. After the distillation, the residue (the bottoms liquid) remaining in the evaporator is recovered to successfully afford an α-hydroxycarboxylic acid composition.

In the case of equilibrium flash distillation, the results will be as follows. That is, the mixed solution charged in an evaporator is heated under pressure. The heated mixed solution is then blown into a flash drum operated at low pressure. As a result, water and organic impurities in the mixed solution are evaporated. An α-hydroxycarboxylic acid composition can be obtained from the bottom of the flash drum by performing gas-liquid separation in the flash drum. The evaporated water and organic impurities are discharged from the top.

Among the above, it is preferable to obtain the α-hydroxycarboxylic acid composition as a residue from the viewpoint of economic efficiency and control of deterioration caused by heating. That is, in one preferred embodiment, the bottoms liquid after distillation preferably contains an α-hydroxycarboxylic acid. In particular, the case that the α-hydroxycarboxylic acid is α-hydroxybutyric acid or α-hydroxyisobutyric acid is preferable because the conditions of the distillation pressure and the distillation temperature set for obtaining the α-hydroxycarboxylic acid as a residue are suitable for purification.

The distillation described above may be either batch distillation or continuous distillation. In the case of continuous distillation, single distillation may be repeated, equilibrium flash distillation may be repeated, rectification may be repeated, or single distillation, equilibrium flash distillation, and rectification may be performed in combination. In the case of continuous distillation, α-hydroxycarboxylic acid compositions may be obtained as evaporated products, α-hydroxycarboxylic acid compositions may be obtained as residues, or a combination thereof also may be employed.

The recovery rate of the α-hydroxycarboxylic acid in the distillation described above is preferably 90% or more, more preferably 95% or more, still more preferably 99% or more, particularly preferably 99.4% or more, and most preferably 99.5% or more.

<α-Hydroxycarboxylic Acid Composition>

The α-hydroxycarboxylic acid composition can be produced by distilling the mixed solution. Therefore, according to one embodiment of the present invention, the α-hydroxycarboxylic acid composition is provided. The α-hydroxycarboxylic acid composition contains an α-hydroxycarboxylic acid. In addition, the α-hydroxycarboxylic acid composition may contain water, an organic impurity, an inorganic impurity, and the like.

The content of the α-hydroxycarboxylic acid (the purity of the α-hydroxycarboxylic acid) is preferably 90% or more, more preferably 95% or more, still more preferably 97% or more, particularly preferably 99%, and most preferably 100%, based on the total mass of the α-hydroxycarboxylic acid composition. When the content of the α-hydroxycarboxylic acid (the purity of the α-hydroxycarboxylic acid) is 100%, the α-hydroxycarboxylic acid composition means the α-hydroxycarboxylic acid itself.

In one preferred embodiment, the α-hydroxycarboxylic acid contains 2-hydroxyisobutyric acid. That is, the content of the 2-hydroxyisobutyric acid (the purity of 2-hydroxyisobutyric acid) is preferably 90% or more, more preferably 95% or more, still more preferably 97% or more, particularly preferably 99%, and most preferably 100%, based on the total mass of the α-hydroxycarboxylic acid composition.

The content of the water is preferably 5% or less, more preferably 3% or less, still more preferably 1% or less, particularly preferably 0.5% or less, and most preferably 0.2% or less, based on the total mass of the α-hydroxycarboxylic acid composition.

Examples of the organic impurities include organic impurities contained in the above-described mixed solution and organic impurities generated by distillation.

Examples of the organic impurities generated by distillation include organic impurities derived from side reactions of the α-hydroxycarboxylic acid produced by the above-described method and contained.

Among the above-described organic impurities, an α-hydroxycarboxylic acid ester, an α,β-unsaturated carboxylic acid, and a dimer of an α-hydroxycarboxylic acid, each having a boiling point similar to that of an α-hydroxycarboxylic acid, may be particularly contained in the α-hydroxycarboxylic acid composition.

The content of the α-hydroxycarboxylic acid ester is preferably 3% or less, more preferably 1% or less, still more preferably 0.5% or less, further preferably 0.1% or less, and most preferably 0.01% or less, based on the total mass of the α-hydroxycarboxylic acid composition.

The content of the α,β-unsaturated carboxylic acid is preferably 3% or less, more preferably 1% or less, still more preferably 0.5% or less, further preferably 0.1% or less, and most preferably 0.03% or less, based on the total mass of the α-hydroxycarboxylic acid composition.

The content of the dimer of the α-hydroxycarboxylic acid is preferably 3% or less, more preferably 1% or less, still more preferably 0.5% or less, further preferably 0.1% or less, and most preferably 0.03% or less, based on the total mass of the α-hydroxycarboxylic acid composition.

The total content of the organic impurities is preferably 3% or less, more preferably 1% or less, still more preferably 0.5% or less, further preferably 0.1% or less, and most preferably 0.07% or less, based on the total mass of the α-hydroxycarboxylic acid composition.

The α-hydroxycarboxylic acid composition has a high purity and allows no or almost no side reactions to occur, and thus has high storage stability. In particular, the α-hydroxycarboxylic acid composition can maintain a high purity even in a high-temperature environment.

<Applications of α-Hydroxycarboxylic Acid Composition>

The α-hydroxycarboxylic acid composition can be applied to various applications.

In one embodiment, the α-hydroxycarboxylic acid composition is used for applications such as foods, cosmetics, fragrances, preservatives, and pH adjusters.

In another embodiment, the α-hydroxycarboxylic acid composition is used as a chemical raw material or an intermediate.

In one preferred embodiment, the α-hydroxycarboxylic acid composition is applied to a polymer raw material. For example, when the α-hydroxycarboxylic acid is glycolic acid or lactic acid, polyglycolic acid, polylactic acid, and a copolymer containing these as monomer units are produced. That is, in one embodiment, there is provided a method for producing a polymer, including polymerizing an α-hydroxycarboxylic acid composition produced by the method described above.

In one preferred embodiment, the α-hydroxycarboxylic acid composition is applied to a raw material of an α,β-unsaturated carboxylic acid. For example, when the α-hydroxycarboxylic acid is 2-hydroxypropionic acid or α-hydroxyisobutyric acid, acrylic acid or methacrylic acid is produced. That is, in one embodiment, there is provided a method for producing an α,β-unsaturated carboxylic acid, including dehydrating an α-hydroxycarboxylic acid composition produced by the method described above.

EXAMPLES

In the following, the present invention will be specifically described with reference to Examples, but the present invention is not limited thereto. Note that "%" is on a mass basis unless otherwise specified.

Example 1

Purification was performed by distillation under reduced pressure.
(Preparation of Mixed Solution)

Using acetone and hydrocyanic acid (hydrogen cyanide) obtained from formamide as raw materials, these were sequentially converted to acetone cyanohydrin (ACH), α-hydroxyisobutyramide, and α-hydroxyisobutyl ester, and then 2-hydroxyisobutyric acid was synthesized (new ACH method). This was diluted with water to prepare a mixed solution containing 2-hydroxyisobutyric acid (HBA), water, and methyl 2-hydroxyisobutyrate (HBM).

The content of HBA was 50.4% by mass and the content of HBM was 0.14% by mass based on the total mass of the mixed solution.
(Distillation)

Into a flask equipped with a thermometer, a condenser, and a pressure reducer was charged 301.9 g of the mixed solution prepared above. Distillation was started under the condition of a pressure of 30 kPaA while nitrogen was blown at 2.0 mL/min. After the temperature of the bottoms liquid reached 90° C., the pressure was reduced to 4.0 kPaA by controlling to 90 to 100° C. Then, after a confirmation that the temperature of the gas phase in the flask reached 100° C., the distillation was terminated and the bottoms liquid was recovered as an HBA composition.

The α-hydroxycarboxylic acid composition contained, in addition to methyl 2-hydroxyisobutyrate (HBM) contained in the mixed solution, methacrylic acid (MAA) and 2-hydroxyisobutyric acid dimer (HBA dimer) produced by side reactions of 2-hydroxyisobutyric acid (HBA).

The upper limit temperature of the bottoms liquid was 135° C. until the termination of the distillation. The time taken from reaching 120° C. to the termination of the distillation was 12 minutes.

The contents of water, methyl 2-hydroxyisobutyrate (HBM), methacrylic acid (MAA), and 2-hydroxyisobutyrate dimer (HBA dimer) in the composition were measured by the following methods.

Specifically, the measurement was performed by a standard addition method using gas chromatograph (hydrogen flame ionization detector: GC-FID, thermal conductivity detector: GC-TCD).

<Preparation of Analytical Sample>

A first analytical sample and a second analytical sample were prepared.

The first analytical sample was prepared by dissolving 7 g of 2-hydroxyisobutyric acid (HBA) in 17.5 g of acetonitrile.

The second analysis sample was prepared by adding 0.2 mL of a standard addition sample (water/methyl 2-hydroxyisobutyrate (HBM)/methacrylic acid (MAA)=30/1/1, volume ratio) to 15 mL of the first analysis sample.

<Quantification of Water (GC-TCD)>

Sample: the first analysis sample, the second analysis sample
Instrument: GC-2030 (Shimadzu Corporation)
Column: Agilent, DB-WAX (length: 30 m, inner diameter: 0.25 mm, film thickness: 0.25 μm)
Carrier: He (30 cm/sec)
Injection port: 250° C. (split 1:10)
Detector: 250° C.
Sample amount: 0.5 μL
Oven: 60° C. (0 min)→4° C./min→80° C. (0 min)→30° C./min→230° C. (10 min)
Retention time: 3.8 min (water)

<Quantification of HBM, MAA, and HBA dimer (GC-FID)>

Instrument: GC-2025 (Shimadzu Corporation)
Column: Agilent, DB-FFAP (length: 30 m, inner diameter: 0.25 mm, film thickness: 0.25 μm)
Carrier: He (30 cm/sec)
Injection port: 250° C. (split 1:50)
Detector: 250° C.
Sample amount: 0.2 μL
Oven: 60° C. (0 min)→4° C./min→80° C. (0 min)→30° C./min→230° C. (10 min)
Retention time: 5.9 min (HBM), 9.2 min (MAA), 9.5 min (HBA dimer)

The content ratio of HBA dimer was calculated as the same sensitivity as that of acetonitrile.

As a result, the contents of water, HBM, MAA, and HBA dimer were 0.12%, 0.01%, 0.02%, and 0.05%, respectively.

The content of 2-hydroxyisobutyric acid (HBA) in the composition (HBA purity) was calculated by subtracting the sum of the contents of water, HBM, MAA, and HBA dimer from 100. As a result, the content of HBA was 99.8%.

The recovery rate of 2-hydroxyisobutyric acid (HBA) was calculated by the following formula, and found to be 99.6%.

[Mathematical Formula 1]

$$HBA \text{ recovery rate } (\%) = \frac{HBA \text{ purity of composition} \times \text{Yield of composition}}{HBA \text{ concentration of mixed solution} \times \text{Amount of mixed solution charged}} \times 100$$

Example 2

An HBA composition was produced in the same manner as in Example 1, except that 304.3 g of the mixed solution prepared in Example 1 was used and distillation was terminated after a confirmation that the temperature of the bottoms liquid reached 120° C. (the upper limit temperature of the bottoms liquid: 120° C.).

The contents of water, HBM, MAA, and HBA dimer were measured in the same manner as in Example 1, and found to be 0.28%, 0.02%, 0.02%, and 0.02%, respectively. In addition, the content of HBA (HBA purity) was 99.7%. Furthermore, the HBA recovery rate was calculated in the same manner as in Example 1, and found to be 99.4%.

Example 3

(Preparation of Mixed Solution)

Using acetone and hydrocyanic acid (hydrogen cyanide) obtained from formamide as raw materials, these were sequentially converted to acetone cyanohydrin (ACH), α-hydroxyisobutyramide, and α-hydroxyisobutyl ester, and then 2-hydroxyisobutyric acid was synthesized (new ACH method). This was diluted with water to prepare a mixed solution containing 2-hydroxyisobutyric acid (HBA), water, and methyl 2-hydroxyisobutyrate (HBM).

The content of HBA was 51.2% by mass and the content of HBM was 0.15% by mass based on the total mass of the mixed solution.

(Distillation)

Into a flask equipped with a thermometer, a condenser, and a pressure reducer was charged 800.1 g of the mixed solution prepared above. Simple distillation was started under the condition of a pressure of 30 kPaA while nitrogen was blown at 5.0 mL/min. After a confirmation that the temperature of the bottoms liquid reached 140° C., the distillation was terminated (upper limit temperature of bottoms liquid: 140° C.), and the bottoms liquid was recovered as an HBA composition (413.5 g).

During the period until the termination of the distillation, the time taken from the time when the temperature of the bottoms liquid reached 120° C. to the termination of the distillation was 19 minutes.

The contents of water, HBM, MAA, and HBA dimer were measured in the same manner as in Example 1, and found to be 1.25%, 0.15%, 0.05%, and 0.15%, respectively. In addition, the content of HBA (HBA purity) was 98.4%. Furthermore, the HBA recovery rate was calculated in the same manner as in Example 1, and found to be 99.3%.

Comparative Example 1

Purification was performed under the condition that the upper limit temperature of the bottoms liquid was higher than 140° C. HBA does not remain in the bottoms liquid and is obtained from the distillate.

Into a flask equipped with a thermometer and a condenser was charged 262.2 g of the mixed solution prepared in Example 1. 188.5 of a fore-run fraction was recovered by atmospheric distillation (101 kPaA), and then 59.6 g of a main distillate was recovered. At this time, the distillate line was heated to 80° C. or higher and coagulation of HBA was thereby prevented. The temperature of the bottoms liquid during the recovery of the main distillate was 232 to 276° C., and the temperature of the gas phase in the flask was 191 to 211° C. The main distillate obtained was obtained as an HBA composition.

The contents of water, HBM, MAA, and HBA dimer were measured in the same manner as in Example 1, and found to be 0.08%, 0%, 5.45%, and 64.6%, respectively. In addition, the content of HBA (HBA purity) was 29.9%. Furthermore, the HBA recovery rate was calculated in the same manner as in Example 1, and found to be 13.5%.

Comparative Example 2

Purification was performed under the condition that the upper limit temperature of the bottoms liquid was higher than 140° C. HBA does not remain in the bottoms liquid and is obtained from the distillate.

Into a flask equipped with a thermometer, a condenser, and a pressure reducer was charged 264.3 g of the mixed solution prepared in Example 1. 137.9 of a fore-run fraction was recovered by atmospheric distillation (101 kPaA), and then the pressure was reduced to 30 kPaA and 89.6 g of a main distillate was recovered. At this time, the distillate line was heated to 80° C. or higher and coagulation of HBA was thereby prevented. The temperature of the bottoms liquid during the recovery of the main distillate was 183 to 235° C., and the temperature of the gas phase in the flask was 155 to 171° C. The main distillate obtained was obtained as an HBA composition.

The contents of water, HBM, MAA, and HBA dimer were measured in the same manner as in Example 1, and found to be 0.09%, 0%, 0.40%, and 14.2%, respectively. In addition, the content of HBA (HBA purity) was 85.3%. Furthermore, the HBA recovery rate was calculated in the same manner as in Example 1, and found to be 57.4%.

Comparative Example 3

Purification was performed by spray drying.

500 g of the mixed solution prepared in Example 1 was sprayed to a spray dryer (SB39) equipped with a two-fluid nozzle under the condition specified by a spray pressure of 0.5 MPa and a spray rate of 496 g/h. The spray dryer was operated at an inlet temperature of 90° C. and an outlet temperature of 54 to 60° C. 166.7 g of a powder resulting from evaporation of the water in the mixed solution was recovered as an HBA composition.

The contents of water, HBM, MAA, and HBA dimer were measured in the same manner as in Example 1, and found to be 0.09%, 0%, 0.01%, and 0%, respectively. In addition, the content of HBA (HBA purity) was 99.9%. Furthermore, the HBA recovery rate was calculated in the same manner as in Example 1, and found to be 66.6%.

Comparative Example 4

Purification was performed by spray drying.

1040 g of the mixed solution prepared in Example 1 was sprayed to a spray dryer (SB39) equipped with a two-fluid nozzle under the condition specified by a spray pressure of 0.2 MPa and a spray rate of 520 g/h. The spray dryer was operated at an inlet temperature of 90° C. and an outlet temperature of 38 to 50° C. 347.9 g of a powder resulting from evaporation of the water in the mixed solution was recovered as an HBA composition.

The contents of water, HBM, MAA, and HBA dimer were measured in the same manner as in Example 1, and found to be 0.40%, 0.01%, 0.02%, and 0%, respectively. In addition, the content of HBA (HBA purity) was 99.6%. Furthermore, the HBA recovery rate was calculated in the same manner as in Example 1, and found to be 66.0%.

Comparative Example 5

Purification was performed by thin-film distillation.

Using a short path distillation unit (KDL −5), 299.4 g of the mixed solution prepared in Example 1 was purified under the condition specified by a degree of vacuum of 40 kPaA, an evaporator temperature of 150° C., an internal condenser temperature of −5° C., a wiper speed of 400 rpm, and a supply rate of 300 g/h. At this time, the bottoms pipe was heated to 100° C. to prevent coagulation of HBA. 123.3 g of the resulting bottoms was obtained as an HBA composition.

The contents of water, HBM, MAA, and HBA dimer were measured in the same manner as in Example 1, and found to be 0.37%, 0.02%, 0.02%, and 0%, respectively. In addition, the content of HBA (HBA purity) was 99.6%. Furthermore, the HBA recovery rate was calculated in the same manner as in Example 1, and found to be 81.3%.

The results of Examples 1 to 3 and Comparative Examples 1 to 5 are shown in Table 1 below.

TABLE 1

| | Purification method | HBA recovery | HBA content in mixed solution (%) | Upper limit temperature of bottoms liquid (° C.) | Pressure (kPaA) | HBA purity (%) | Water (%) | HBM (%) | MAA (%) | HBA dimer (%) | Recovery rate (%) |
|---|---|---|---|---|---|---|---|---|---|---|---|
| Example 1 | Distillation under reduced pressure | Concentration recovery | 50.4 | 135 | 4-30 | 99.8 | 0.12 | 0.01 | 0.02 | 0.05 | 99.6 |
| Example 2 | Distillation under reduced pressure | Concentration recovery | 50.4 | 120 | 4-30 | 99.7 | 0.28 | 0.02 | 0.02 | 0.02 | 99.4 |
| Example 3 | Distillation under reduced pressure | Concentration recovery | 51.2 | 140 | 30 | 98.4 | 1.25 | 0.15 | 0.05 | 0.15 | 99.3 |
| Comparative Example 1 | Distillation under reduced pressure | Distillate recovery | 50.4 | 232-276 | 101 (Normal pressure) | 29.9 | 0.08 | 0 | 5.45 | 64.6 | 13.5 |
| Comparative Example 2 | Distillation under reduced pressure | Distillate recovery | 50.4 | 183-235 | 30 | 85.3 | 0.09 | 0 | 0.40 | 14.21 | 57.4 |
| Comparative Example 3 | Spray drying | — | 50.4 | — | 101 (Normal pressure) | 99.9 | 0.09 | 0 | 0.01 | 0 | 66.6 |

TABLE 1-continued

| | Purification method | HBA recovery | HBA content in mixed solution (%) | Upper limit temperature of bottoms liquid (° C.) | Pressure (kPaA) | HBA purity (%) | Water (%) | HBM (%) | MAA (%) | HBA dimer (%) | Recovery rate (%) |
|---|---|---|---|---|---|---|---|---|---|---|---|
| Comparative Example 4 | Spray drying | — | 50.4 | — | 101 (Normal pressure) | 99.6 | 0.40 | 0.01 | 0.02 | 0 | 66.0 |
| Comparative Example 5 | Thin film distillation | — | 50.4 | — | 40 | 99.6 | 0.37 | 0.02 | 0.02 | 0 | 81.3 |

From the results in Table 1, it can be seen that in Examples 1 to 3 were obtained HBA compositions purified in a high yield and a high purity.

On the other hand, it is considered that in Comparative Examples 1 and 2, since the upper limit temperature of the bottoms liquid was high, MAA resulting from the dehydration reaction of HBA and HBA dimer resulting from dimerization of HBA were generated, and the recovery rate and the purity of HBA were decreased.

In Comparative Examples 3 and 4, the particle size of the substantially powdery HBA composition obtained by evaporating the water of the mixed solution by spray drying is small. As a result, it is considered that since the substantially powdery HBA composition was discharged without being recovered or collected by a powder collector, a cyclone, or the like, the recovery rate decreased. In Comparative Examples 3 and 4, in order to reliably evaporate water in the mixed solution by spray drying, the size of droplets to be sprayed is reduced, and as a result, the substantially powdery HBA composition with a reduced particle size is obtained.

Furthermore, the short path distillation unit (KDL-5) used in Comparative Example 5 was a vertical evaporator type distillation unit incorporating a wiper. In this form of distillation, a liquid sample is introduced from the upper part, and continuous distillation is performed with a thin film being formed on the inner wall of the evaporator with a roller wiper. The condensing surface is relatively disposed at a position close to the evaporating surface. Under the condition of thin film distillation with such a short path distillation unit, it is considered that the recovery rate was reduced due to partial volatilization of HBA during the evaporation treatment.

[Heating Storage Test of α-Hydroxycarboxylic Acid Composition]

The stability of an HBA composition containing a 2-hydroxyisobutyric acid (HBA) composition, water and methacrylic acid (MAA) under heating conditions was examined. In the composition, the content of HBA was 99.6%, the content of water was 0.43%, and the content of MAA was 0.01%.

Specifically, 50 g of the HBA composition was charged into a flask equipped with a thermometer, a condenser, and a pressure reducer, and the inside of the flask was heated and held at 120° C. or 140° C. while nitrogen was blown at 2.0 mL/min under normal pressure, and the change over time of the HBA composition was examined. The results obtained are shown in Table 2 below.

TABLE 2

| Change in composition at 120° C. | | | | | |
|---|---|---|---|---|---|
| | 0 hours | 3 hours | 6 hours | 9 hours | 22 hours |
| HBA (%) | 99.56 | 99.41 | 99.24 | 99.07 | 98.42 |
| Water (%) | 0.43 | 0.42 | 0.42 | 0.46 | 0.5 |
| HBM (%) | 0 | 0 | 0 | 0 | 0 |
| MAA (%) | 0.01 | 0.01 | 0.03 | 0.05 | 0.08 |
| HBA dimer (%) | 0 | 0.16 | 0.31 | 0.42 | 1 |

| Change in composition at 140° C. | | | | | |
|---|---|---|---|---|---|
| | 0 hours | 3 hours | 6 hours | 9 hours | 22 hours |
| HBA (%) | 99.56 | 98.81 | 98.01 | 97.33 | 96.01 |
| Water (%) | 0.43 | 0.48 | 0.61 | 0.69 | 1.31 |
| HBM (%) | 0 | 0 | 0 | 0 | 0 |
| MAA (%) | 0.01 | 0.02 | 0.07 | 0.11 | 0.24 |
| HBA dimer (%) | 0 | 0.69 | 1.31 | 1.87 | 2.43 |

From the results in Table 2, it can be seen that the high-purity HBA composition can maintain a high purity even in a high temperature environment of 120° C. or 140° C.

The invention claimed is:

1. A method for producing an α-hydroxycarboxylic acid composition, comprising reduced pressure distilling a mixed solution containing an α-hydroxycarboxylic acid, water, and an organic impurity,
   wherein the α-hydroxycarboxylic acid comprises 2-hydroxyisobutyric acid,
   wherein the distillation is performed under a condition that an upper limit temperature of a bottoms liquid is 140° C. or lower.

2. The method according to claim 1, wherein a content of 2-hydroxyisobutyric acid in the α-hydroxycarboxylic acid composition is 95% or more based on a total mass of the α-hydroxycarboxylic acid composition.

3. The method according to claim 1, wherein the upper limit temperature of the bottoms liquid is 135° C. or lower.

4. The method according to claim 1, wherein the bottoms liquid after the distillation contains an α-hydroxycarboxylic acid.

5. A method for producing an α,β-unsaturated carboxylic acid, comprising:
   producing an α-hydroxycarboxylic acid composition by the method according to claim 1, and
   dehydrating the α-hydroxycarboxylic acid.

6. The method according to claim 2, wherein the upper limit temperature of the bottoms liquid is 135° C. or lower.

7. The method according to claim 3, wherein the bottoms liquid after the distillation contains an α-hydroxycarboxylic acid.

8. The method according to claim 6, wherein the bottoms liquid after the distillation contains an α-hydroxycarboxylic acid.

* * * * *